(12) United States Patent
Rosenfeld et al.

(10) Patent No.: US 8,204,677 B2
(45) Date of Patent: Jun. 19, 2012

(54) TRACKING METHOD

(75) Inventors: Daniel Rosenfeld, Haifa (IL); Ofer Salama, Yokneam (IL)

(73) Assignee: Rafael—Armament Development, Haifa (IL)

( * ) Notice: Subject to any disclaimer, the term of this patent is extended or adjusted under 35 U.S.C. 154(b) by 1195 days.

(21) Appl. No.: 11/936,099

(22) Filed: Nov. 7, 2007

(65) Prior Publication Data

US 2008/0120031 A1    May 22, 2008

(30) Foreign Application Priority Data

Nov. 16, 2006 (IL) .......................................... 179344

(51) Int. Cl.
*G01C 21/00* (2006.01)

(52) U.S. Cl. .............. 701/220; 701/1; 701/16; 701/202; 342/36; 342/62; 342/359; 342/450; 342/451

(58) Field of Classification Search ................ 701/1, 16, 701/202, 220; 342/36, 62, 359, 450, 451, 342/352, 357.31, 357.48, 357.29, 357.32, 342/357.42, 357.68, 357.3, 417, 424, 447, 342/357.59, 357.65; 375/5.1
See application file for complete search history.

(56) References Cited

U.S. PATENT DOCUMENTS

| | | | | |
|---|---|---|---|---|
| 4,303,978 A | * | 12/1981 | Shaw et al. | 701/220 |
| 5,465,142 A | * | 11/1995 | Krumes et al. | 356/5.01 |
| 6,377,041 B1 | * | 4/2002 | Jones et al. | 324/244 |
| 6,445,344 B1 | | 9/2002 | Wise et al. | |
| 6,611,141 B1 | | 8/2003 | Schulz | |
| 6,826,477 B2 | * | 11/2004 | Ladetto et al. | 701/217 |
| 7,139,651 B2 | | 11/2006 | Knowlton | |
| 7,256,728 B1 | * | 8/2007 | Kenny et al. | 342/36 |
| 7,650,232 B1 | * | 1/2010 | Paielli | 701/205 |
| 2001/0020216 A1 | | 9/2001 | Lin | |
| 2005/0035900 A1 | | 2/2005 | Zaugg | |
| 2005/0187677 A1 | * | 8/2005 | Walker | 701/16 |
| 2005/0248486 A1 | | 11/2005 | Lee | |
| 2007/0050138 A1 | | 3/2007 | Morgan | |

OTHER PUBLICATIONS

Walchko et al., Inertial Navigation, 2002, Internet, p. 1-9.*

* cited by examiner

*Primary Examiner* — James Trammell
*Assistant Examiner* — McDieunel Marc

(57) ABSTRACT

A method for tracking a moving platform (MP) wherein the MP uses an on-board navigation system (NS). Data provided by the navigation system on board the moving platform (MP) is merged with data obtained using a tracking system that tracks the MP from another location. A typical navigation system on board the moving platforms is an inertial navigation system (INS). State data of one or more MP is sent to a processing facility and state data of one or more electromagnetic tracking (EMT) is collected by one or more processing facility. The collected states data from the sources are processed, using the one or more processing facilities for calculating tracking data are used to direct one or more antennas for MP tracking. The state data from one or more MP's are sent using a communications channel.

7 Claims, 7 Drawing Sheets

TRACKING METHOD

FIELD OF THE INVENTION

The present invention is in the field of inertial navigation. More specifically the invention is regarding combination of information from several sources to improve the accuracy of tracking a platform bearing a navigation system.

BACKGROUND OF THE INVENTION

Inertial and electromagnetic tracking are the two main methods of tracking mobile platforms (MP) such as airplanes, missiles, boats and cars. An electromagnetic tracking system (EMT) is typically based on estimating the direction of the maximum electromagnetic intensity at the receiver. Step track, conical scan and monopulse are examples of EMT methods.

An antenna typically has a beam width ranging from a fraction of a degree to several degrees. While this is sufficiently accurate for some tasks such as locating the target, it is not accurate enough for other tasks. In step tracking which is also referred to as hill climbing, the signal location is assumed known within the uncertainty of the antenna's main beam and the antenna is initially pointed at the estimated signal location. The antenna is then open loop commanded by equal and opposite angular displacements from this estimated signal location, e.g. in the azimuth direction, and the received signal level is measured at both angular displacements. Likewise, the antenna is also open loop commanded by equal and opposite angular displacements in the orthogonal plane, e.g., the elevation direction, and again the signal level at each displacement is again measured. If the signal level in each plane is identical at both angular displacements, the antenna is correctly boresighted with the signal. Differences in the signal level at the two angular offsets can be used to realign the antenna so that the boresight axis is coincident with the signal path direction.

Conical scanning is a method used to properly steer the antenna to track an MP. In this case, the antenna is continuously rotated at an offset angle relative to the tracking axis, or has a feed that is rotated about the antenna's tracking axis. As the beam rotates around the tracking axis beam returns from the MP are measured. Considering the case in which the MP is not aligned with the tracking axis, an amplitude modulation (AM) exists on top of the returned signal. This AM envelope corresponds to the position of the target relative to the tracking axis. Thus, the extracted AM envelope can be used to drive a servo-control system in order to align the target with the tracking axis. Typically, a conical scan system needs at least four MP beam returns to be able to determine the MP azimuth and elevation coordinate (two returns per coordinate).

Amplitude comparison monopulse tracking is similar to a conical scan in the sense that four squinted beams are typically required to measure the target's angular position. The difference is that the four beams are generated simultaneously rather than sequentially. For this purpose, a special antenna feed is utilized such that the four beams are produced simultaneously. Typically, four feeds, mainly horns, are used to produce the monopulse antenna pattern. When a mobile platform is located on the antenna tracking axis the four horns receive an equal amount of energy. However, when the target is off the tracking axis an imbalance of energy occurs within the different beams. This imbalance of energy is used to generate an error signal that drives the servo-control system. Typical monopulse processing consists of computing a sum and two difference (azimuth and elevation) antenna patterns. Then, by dividing a difference channel voltage by the sum channel voltage, the angle of the signal can be determined.

Electromagnetic tracking is involved with errors in estimating the MP state; some of the causes for electromagnetic (EM) errors are described as follows. Measurement of the return EM reference from a moving platform is not accurate and is sensitive to return EM intensity variations (e.g. as a result of airplane maneuvers). The multipath phenomenon is the propagation that results in radio signals reaching the receiving antenna by two or more paths. Causes of the multipath include atmospheric ducting, ionospheric reflection and refraction and reflection from terrestrial objects, such as mountains and buildings. The multipath effect causes changes in received EM intensity signal (which is often called scintillation or signal "breathing") especially when the elevation angle of the antenna is close to the horizon as described schematically in FIG. 1. Ground station antenna 22 is directed towards moving target 24. As a result of the antenna low elevation angle, signal returns are obtained not only from direct path 26, i.e. the line of sight (LOS) to the target, but also from other directions 28 a result of the multipath phenomenon, reflecting off surface objects 30.

Navigation systems (NSs) on board moving platforms (MPs) are installed typically on board spacecrafts, missiles, aircrafts, surface ships, submarines or land vehicles. Typical NSs in use are inertial navigation systems (INS), global positioning systems (GPS) and star trackers. The INS typically consists of an inertial measurement unit (IMU) containing a cluster of sensors such as accelerometers and gyroscopes, which measure the platform linear acceleration and angular velocity respectively. Navigation computers calculate an estimate of the position, velocity, attitude and attitude rate of the mobile platform (starting from known initial conditions). This is achieved by integrating the sensor measurements, while taking into account the gravitational acceleration. INS suffers from integration drift, as small errors in measurement are integrated into progressively larger errors in velocity and especially position. This is a problem that is inherent in every open loop control system. The INS is inherently well suited for integrated navigation, guidance and control of host MPs. Its IMU measures the derivative of the variables to be controlled (e.g., position velocity and attitude). The INS is typically autonomous and does not rely on any external aids or on visibility conditions. It is therefore immune to jamming and deception. An inertial tracking system (ITS) which is usually based on INS, computes the relative change in position and orientation from the appearing acceleration and angular velocity in the MP with respect to an inertial reference coordinate system as illustrated schematically in two dimensions in FIG. 2 to which reference is now made. Solid arrows 40 and dashed lines 42 represent the MP computed and actual orientation vectors respectively, filled 44 and unfilled 46 circles represent the computed and actual MP position respectively.

With a known absolute start position $p_0$ and start orientation vector $q_0$ at time $T_0$ the orientations vectors $q_1$, $q_2$ and positions $p_1$, $p_2$ at time $T_1$ and $T_2$ respectively are determined. The inertial tracker computes the relative changes in position $\Delta p_1$ $\Delta p_2$ and orientation $\Delta q_1$, $\Delta q_2$ and from the start configuration the actual position and orientation is determined.

The MP tracking errors such as position, orientation, velocity and acceleration in both methods cause degradations in tracking performance. Such degradations are noticeable, for example, when using a narrow beam antenna to track an MP, in such a case an accurate tracking system is needed to pin-point an MP. In another example, a narrow beam antenna is pointed towards an MP. When the antenna's axis is aligned exactly with the line of sight (LOS) between the antenna and the MP, a strong signal is detected. As the tracking error increases (i.e. the antenna axis is shifted with respect to the line of sight) the signal power decreases proportionally to the tracking error (within the limits of the main lobe). This power loss should be taken into account in power link budget calculations.

DETAILED DESCRIPTION OF THE PRESENT INVENTION

Figure 1:
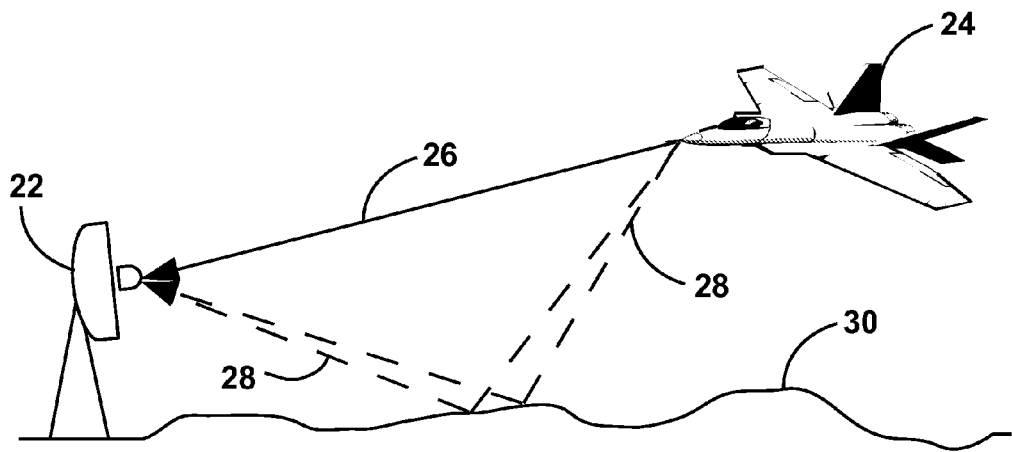
FIG. 1 is a schematic illustration of the multipath effect.
Figure 2:
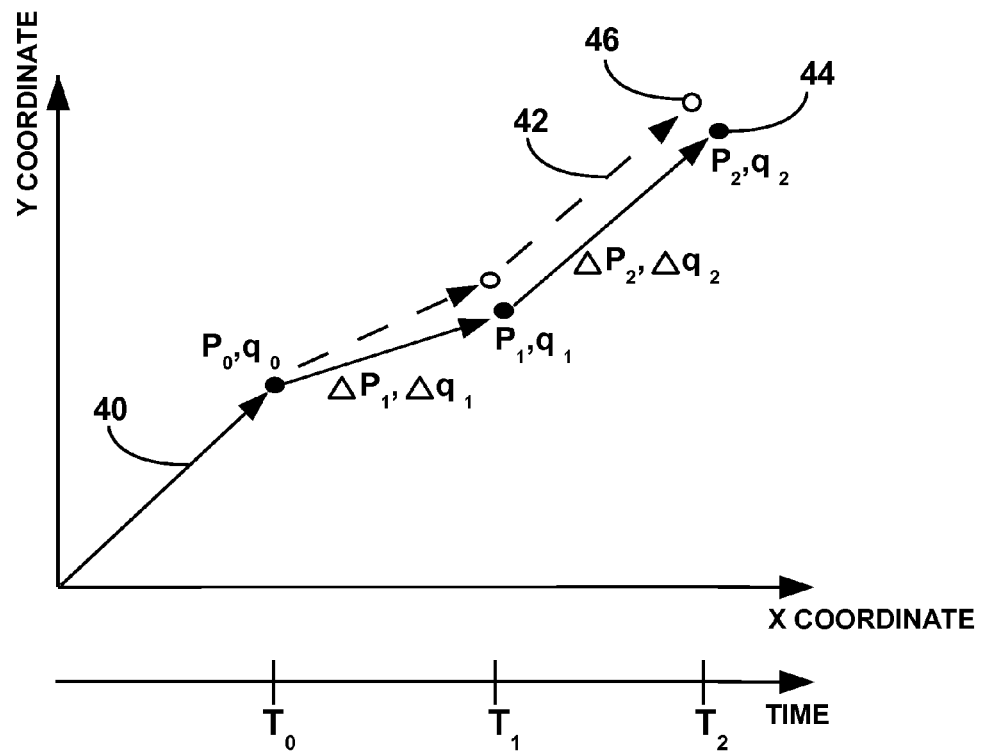
FIG. 2 is a schematic description illustrating MP position calculated with inertial tracking.
Figure 3A:
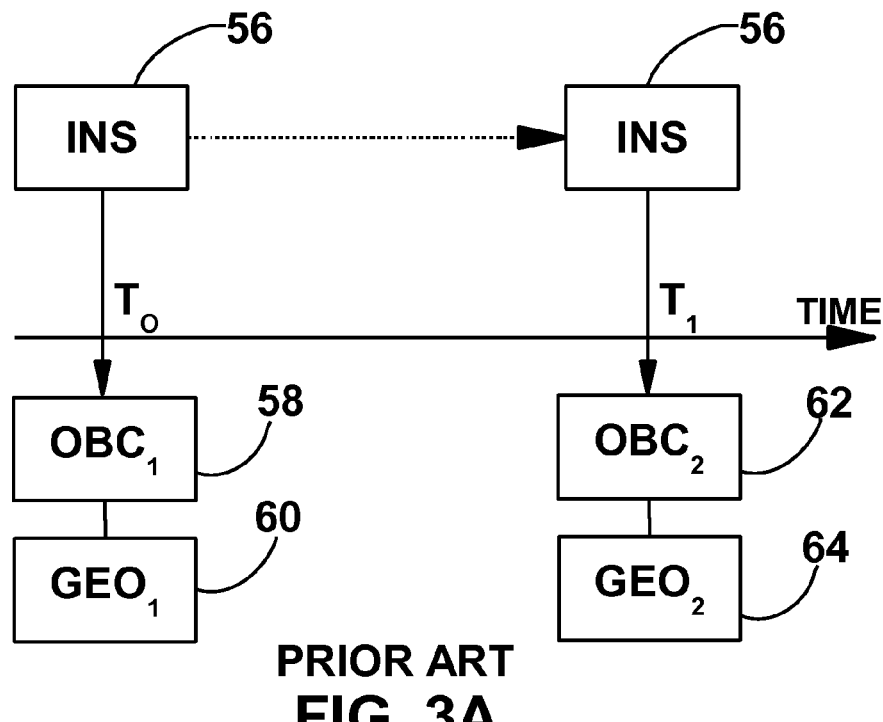
FIG. 3A is a schematic representation of the data registration involving inertial tracking system.
Figure 3B:
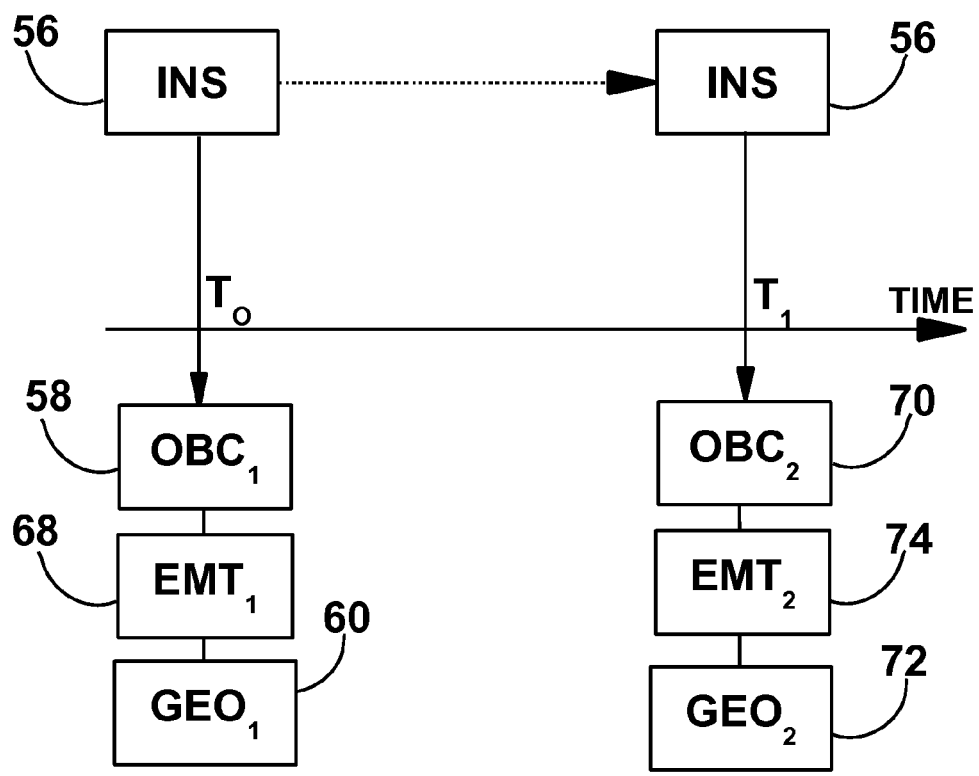
FIG. 3B is a schematic representation of data registration involving two tracking systems.

In accordance with the present invention, the data provided by a navigation system on board a moving platform (MP) is merged with data obtained using a tracking system that tracks the MP from another location. A typical navigation system on board the moving platforms is an inertial navigation system (INS). In FIGS. 3A-B to which reference is now made, a schematic layout of the components of a scenario in which the present invention is implemented is portrayed. Inertial navigation system 56 on board a moving platform (MP) starts off at time $T_0$ in which its on-board coordinates (OBC) 58 are given in terms of geographical coordinates, are registered to geographical coordinates $GEO_1$ 60. After a period, the INS on-board the MP has moved to another location, acquiring a new set of on-board coordinates 62, corresponding to geographical coordinates $GEO_2$ 64. This new set of on-board coordinates is however considered as deviating from real world coordinates 64 corresponding to the location of the INS on-board the MP. This deviation results from the accumulation of errors of the INS. In FIG. 3B, in accordance with the present invention an EMT (electromagnetic tracking system) is used as an additional tracking mechanism to track the MP. Inertial navigation system (INS) 56 on board a moving platform (MP) starts off at time $T_0$ in which its on-board coordinates 58 given in terms of geographical coordinates, are registered to geographical coordinates $GEO_1$ 60. The on-board acquired coordinates are sent off for processing in the tracking system state estimator (TSS), not shown in the figure, through a communication channel, typically wireless. The TSS implements a data merging process to update the estimate of the current MP state and also predict the MP's next state. This estimation and prediction is sent to the EMT as information and is used as tracking data to direct the antenna to track the MP. At time $T_1$ (which can be a long or a short time interval), the INS on-board the MP has moved to another location, acquiring new set of on-board coordinates 70, corresponding to geographical coordinates $GEO_2$ 72. This new set of MP on-board coordinates is sent to the TSS typically through a wireless communication channel and used by the EMT to track the MP.

In another scenario, In order to correct the OBC of MP the EMT tracking data is processed in the TSS. The processed data is sent to the NS on-board the MP to update the OBC of the MP. For example, when the NS is an INS, in order to correct INS drift, the EMT tracking data is processed in the TSS. The processed data is sent to the INS on-board the MP to correct the drift in INS OBC.

Figure 4:
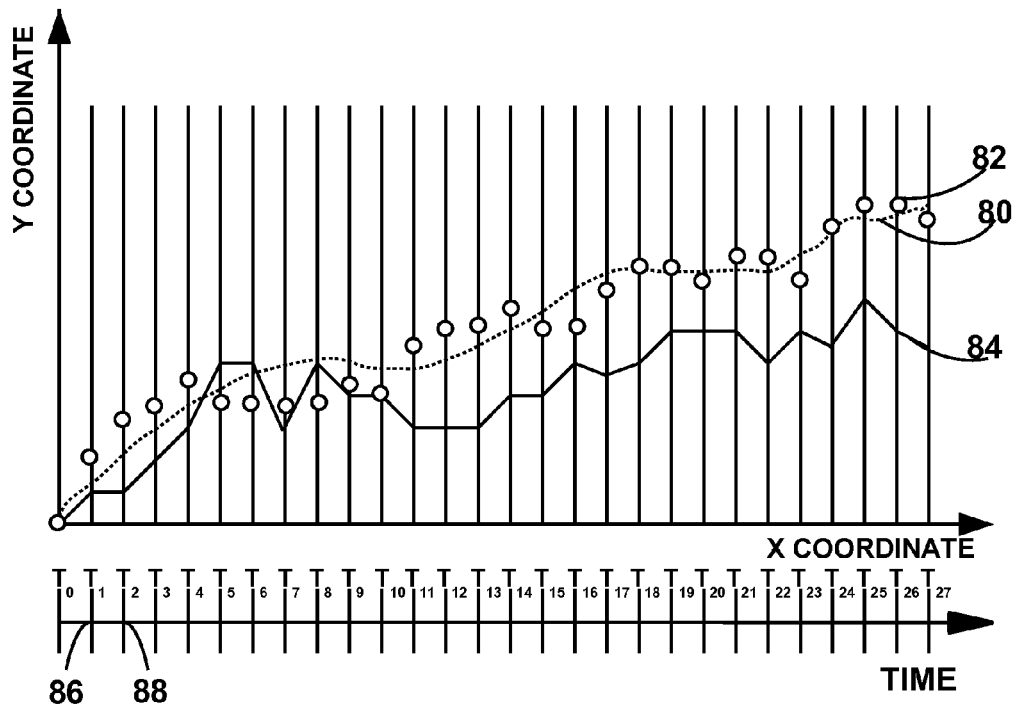
FIG. 4 is schematic illustration of a moving platform path in real space and paths calculated via EM and INS measurements.

An example illustrating a path of an MP in two dimensions and MP paths derived from EMT and INS measurements is described schematically in FIG. 4 to which reference is now made. Path 80 is a graph illustrating the real path of an MP movement in space. The MP starts to move at time $T_0$ and stops at time $T_{27}$. Path 82 is a collection of points each representing a measurement and calculation made by EMT successively in time periods $T_0$ to $T_{27}$. Path 84 represents the INS measurements accumulating error in time. The time it takes an MP to move from one point at time $T_1$ 86 to another point at time $T_2$ 88 is the time interval during which the INS accumulates an error. Bias and drifts, hysteresis and temperature are typical sources of INS errors which are explained in the following. Bias and drifts are the most devastating effectors to INS inertial measurement unit (IMU). Drift rate for the gyros and accelerometers bias are small offsets which the IMU incorrectly reads. The bias has a quadratic effect on the position derived from the IMU. The IMU's accelerometers and gyros are sensitive to temperature, as the temperature of the IMU changes the associated bias and drift.

The NS data such as MP position, velocity and acceleration is referred to hereinafter as NS state data. The EMT data such as range, antenna elevation and azimuth, MP position, velocity and acceleration is referred to hereinafter as EMT state data. The real MP data such as MP position, velocity and acceleration is referred to hereinafter as real MP state data.

In accordance with the present invention, state data generated on board the MP, typically NS data at one point in time, is used to decrease tracking error and thus to reduce tracking inaccuracy, increasing therefore the accuracy of the estimate of the position of the MP in a next point in time. To make use of the on-board generated state data, this data is merged with the state data generated by the EMT unit. The data merged from these two sources are used in estimating the current MP state and in the prediction of the next MP state. To this end, the NS state data is sent through a communications channel to a processing facility which also accepts the EMT unit generated state data. The processing facility may be installed in the EMT system, in the on-board MP or in any other locations and combinations thereof.

Figure 5A:
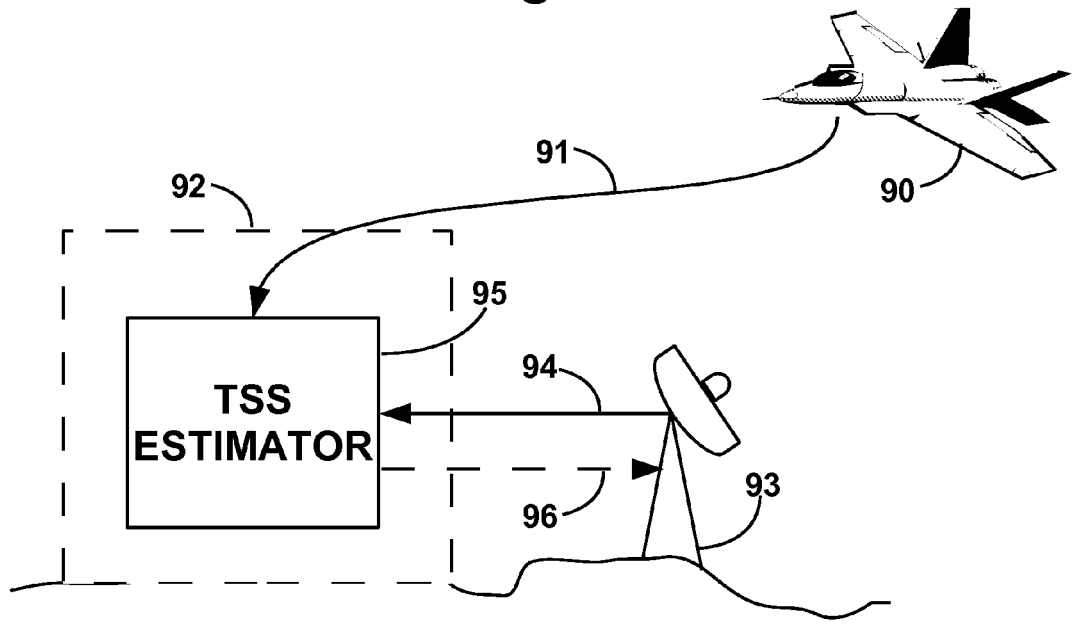
FIG. 5A is a schematic description illustrating merging moving platform state data and EMT state data.
Figure 5B:
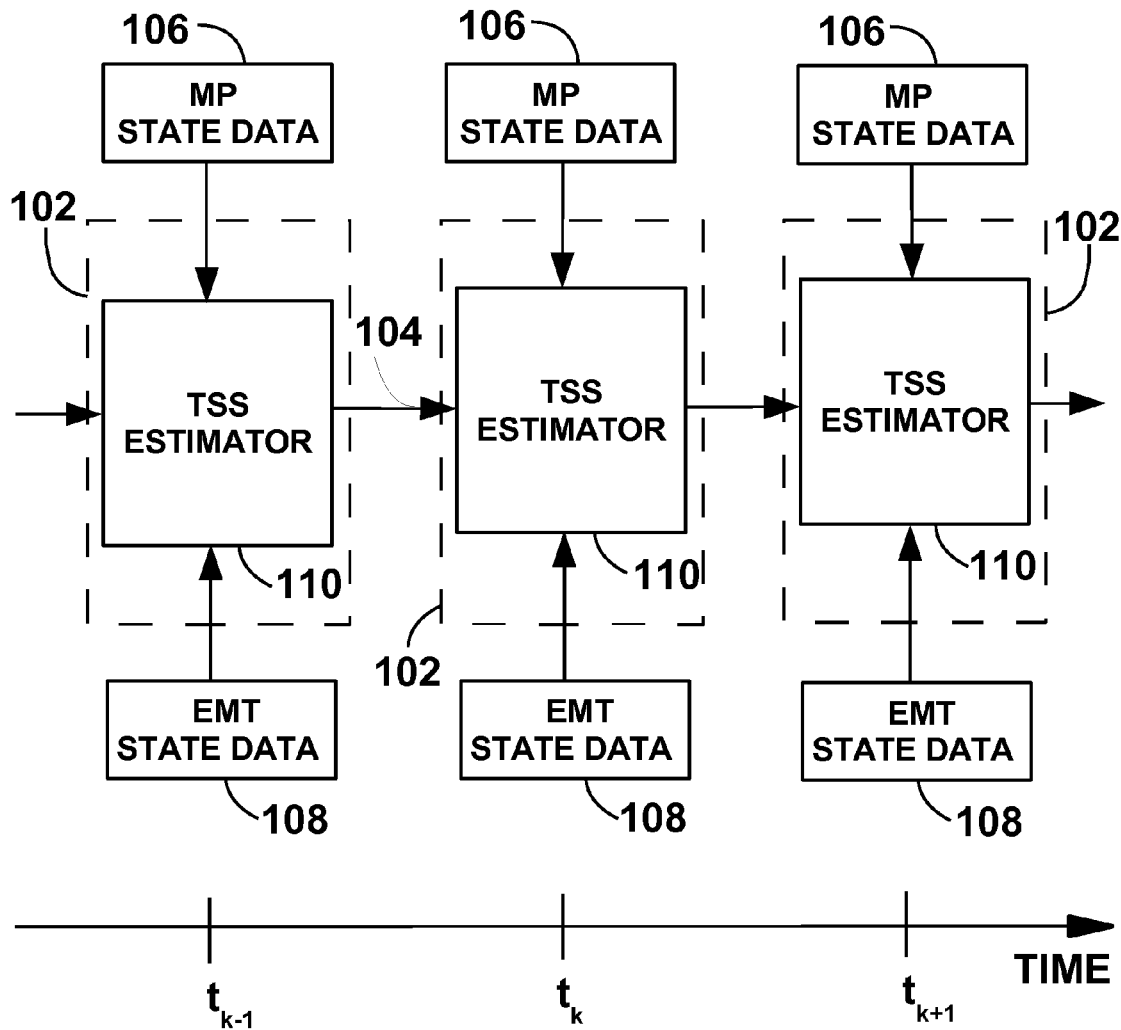
FIG. 5B is a schematic description of a moving platform state data estimation.

An example of merging of the INS on board the MP and EMT state data is described schematically in FIG. 5A-5B. Reference is now made to FIG. 5A. An INS on board MP 90 sends the MP state data through communication channel 91 to processing facility 92. At the same time EMT system 93 calculates MP state data too and sends the data 94 to the processing facility. The TSS 95 implements a merging process to update the estimate of the current MP and also to predict the MP's next state as regards the EMT. This estimation and prediction is sent to the EMT as information 96 and is used as tracking data to drive the antenna to track the MP. A Kalman filter can be used to implement the merging process. The Kalman filter in the context of the present invention will be described later in further detail. Reference is now made to FIG. 5B. In the initial state at time $t_k$ processing facility 102 receives or estimates initial MP state data 104. The NS on board a MP sends NS state data 106 through a communication channel to processing facility 102 at $t_k$, concurrently, EMT system 108 calculates the EMT state and sends it to processing facility 102. Each of these two MP state data have respective variances with respect to the MP state data at time $t_k$. Tracking system estimator (TSS) 110 implements a merging process to update and estimate the current MP state and also to predict the next MP state (NMPS) at time $t_{k+1}$. Then, at time $t_{k+1}$ the merging process receives the NMPS estimate generated at $t_k$, INS state data at $t_{k+1}$ and EMT state data at $t_{k+1}$. The TSS implements a merging process to update the estimate of current MP state at time $t_{k+1}$ and also to produce an estimate of the NMPS.

Figures 6A, 6B:
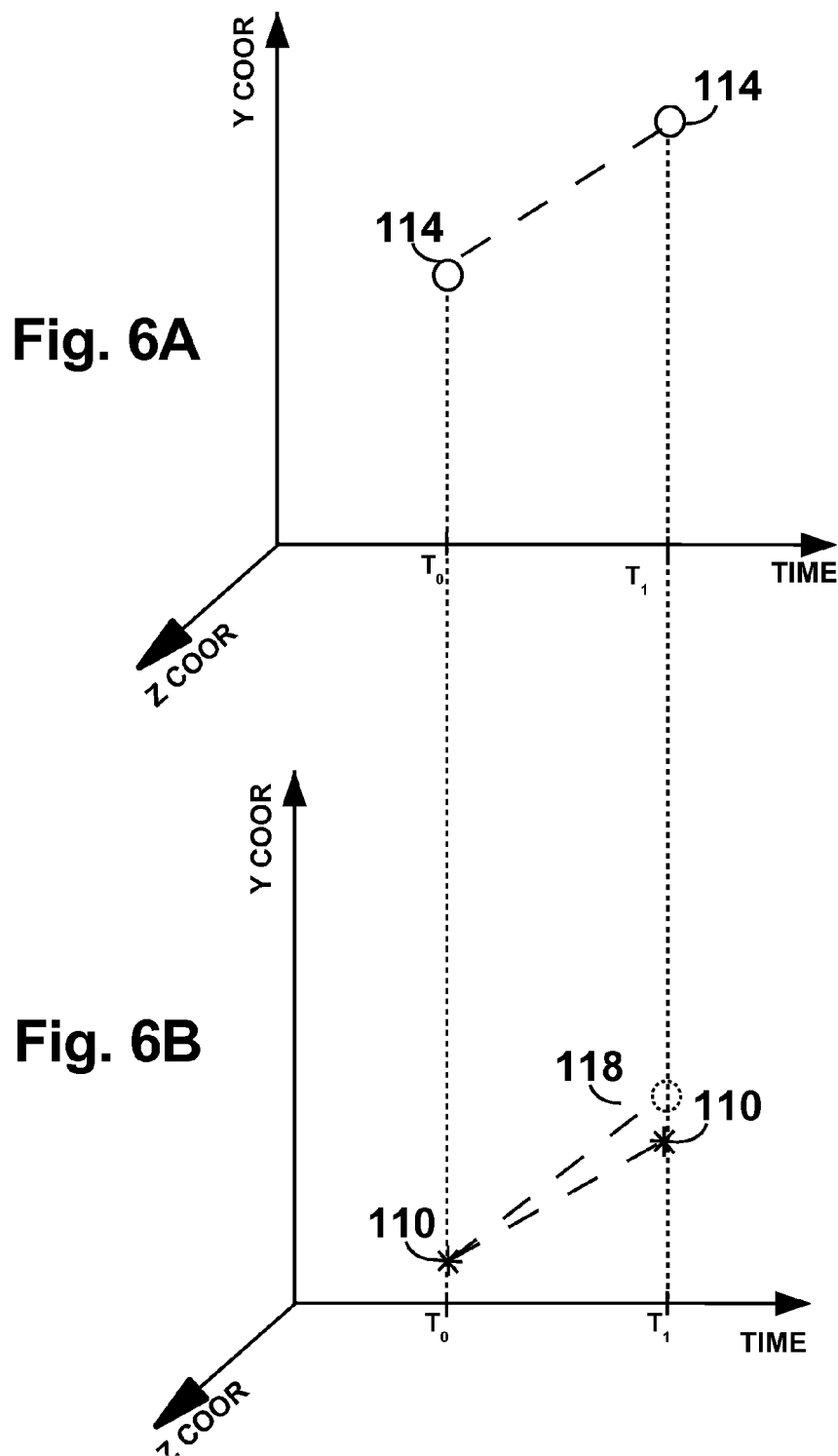
FIG. 6A is a schematic description of a moving platform INS calculated MP state data at time $T_0$, $T_1$.
FIG. 6B is a schematic description of a moving platform state data estimation at time $T_0$, $T_1$.

In another scenario, the navigation system on board the MP is an INS which inherently accumulates error over time. In such error accumulating scenarios, measuring the difference in state data over a small period of time is advantageous. An example showing the advantage of using such differential state data is described schematically in FIG. 6A-6B to which reference is now made. In this case the INS had operated long enough to accumulate significant error and thus, absolutely, the location data are not accurate. However, for a substantially small difference in time (difference in time between $T_0$ and $T_1$ in the drawing) only a small INS drift accumulates, thus respectively, the INS difference state data are substantially more accurate. Those difference data are used by the TSS to improve estimation accuracy. Asterisk 110 indicates the actual state data of an MP at time $T_0$, $T_1$. Solid circles 114 indicate the INS calculated MP state data at time $T_0$, $T_1$. Dashed circle 118 indicates the estimated state data of MP at time $T_1$ by using the drifted INS state data of the MP. In this example, only the MP position state data has been considered. Suppose at time $T_0$ the MP state data is known, than to estimate the MP state data at $T_1$ the differences between INS calculated MP position at time $T_0$ and $T_1$ is added to the MP state data at time $T_0$. The accumulation is utilized in order to estimate the MP position at $T_1$. As depicted in FIG. 6B, the difference in time between $T_0$ and $T_1$ is substantially small, a small INS drift accumulates, and the MP state data and the estimated MP state data at $T_1$ are considered substantially equal.

Linear or non-linear Kalman filters such as an extended Kalman filter (EKF) can be used to implement the MP position estimate. Kalman filter can be implemented by software or hardware and can be installed in the tracked moving object, the tracking system or in another static or mobile processing facility. Although the basic Kalman filter is limited to linear assumptions, most of the non-trivial systems are non-linear. The non-linearity can be associated either with the process model, the observation model or with both. The advantage of the nonlinear Kalman filters is that they can be used to directly estimate the MP dynamics (which are non-linear in most cases). Both the MP states and the sensor measurement equations can have nonlinear terms. This results in better estimation accuracy, over a wider range of operating conditions. The Kalman filter is an extremely effective and versatile procedure for combining data from multiple sources to estimate the state of a system with uncertain dynamics. With respect to the present invention, such data are INS and EM MP state calculations, typically MP position and velocity. The system state may include for example the position, velocity, acceleration of the MP or the EMT. Uncertain dynamics according to the present invention includes unpredictable disturbances of MP and/or EMT, whether caused by human operator or by the medium (e.g., winds surface currents, mobile platform maneuvers, ray deflection and scintillation). The Kalman filter maintains two types of variables estimates, the state vector and the covariance matrix. The components of the estimated state vector include the variables of interest (i.e. MP position, MP velocity, EMT angular data for directing EMT antenna to MP). The Kalman filter state variables for a specific application must include all those system dynamics variables that are measurable by the sensors used in the application. Covariance matrix, is a measure of estimation uncertainty, taking into account how sensor noise and dynamic uncertainty contribute to uncertainty of the estimated system state.

By maintaining an estimate of its own estimation uncertainty and the relative uncertainty in the various measurements outputs, a linear Kalman filter is able to combine all sensor information "optimally", in the sense that the resulting estimate minimizes any quadratic loss function of estimation error, including the mean-squared value of any linear combination of state estimation error. The Kalman gain, is the optimal weighting matrix for combining new measured sources with prior estimate to obtain a new estimate.

EXAMPLE 1

Use of Nonlinear Kalman Filter

The following is an example of the use of a nonlinear Kalman filter for combining the data measured by an INS with monopulse data to estimate the state of a mobile platform.

The scenario includes a ground station (GS) and an MP, e.g., an aircraft (AC). The AC contains an INS, which measures the inertial position and velocity of the AC. This data is transmitted to the GS. The GS contains a communications antenna with a monopulse system. A Cartesian system of coordinates (X,Y,Z) is positioned at the base of the GS antenna turning device. The AC is located at position $(p_x, p_y, p_z)$ and travels at linear velocity $(v_x, v_y, v_z)$ and linear acceleration $(a_x, a_y, a_z)$.

Comment: an INS system normally represents the AC state (position, velocity, acceleration) in a global system of coordinates, such as LLA (longitude, latitude, altitude). It is assumed here that this state is converted (by the GS or the AC) to the geocentric coordinate system (GCS) centered system of coordinates (X,Y,Z).

Figure 7:
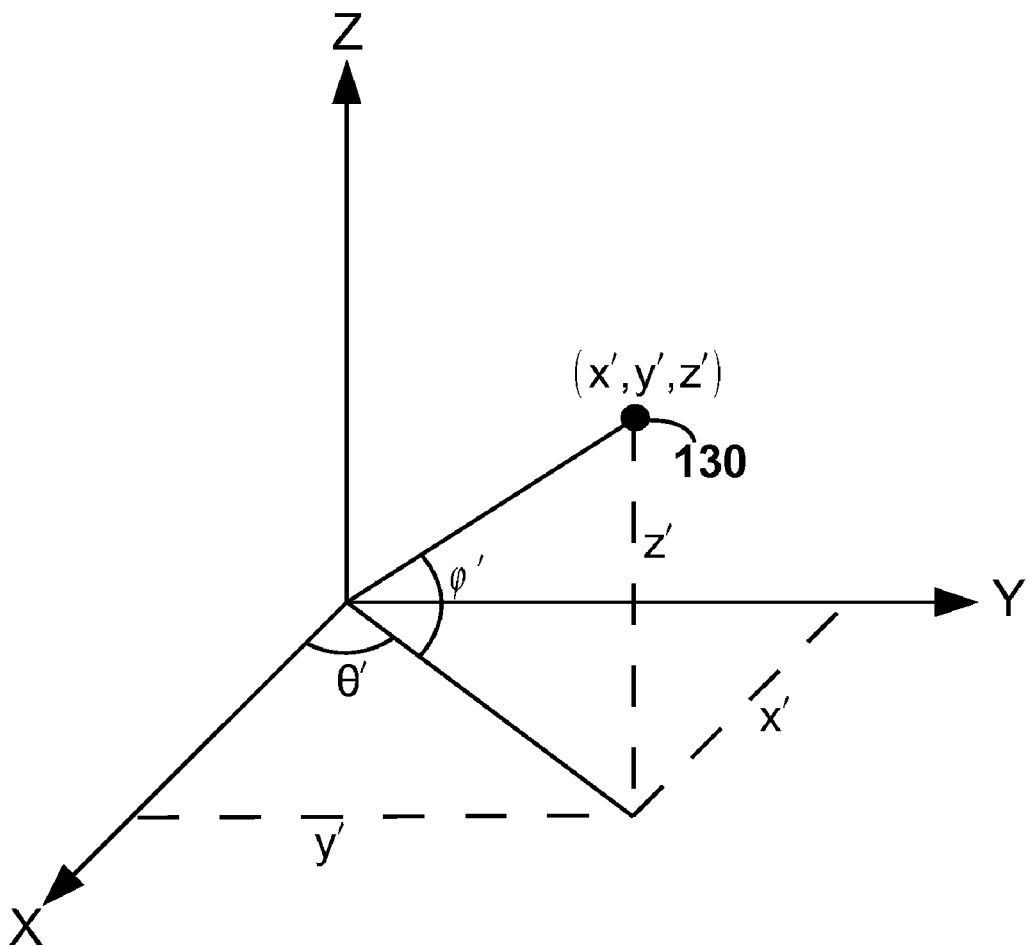
FIG. 7 is a schematic description of system coordinates (X,Y,Z)

The GS antenna points at direction $(\Theta, \Phi)$, where $\Theta$ designates the azimuth and $\Phi$ the elevation of the antenna, as measured by the encoders of the motors in the antenna turning device. At a given time instance, the GS antenna points at direction $(\Theta, \Phi)$ and the monopulse reception device of the antenna measures a deviation error of $(\delta\theta, \delta\phi)$ in the azimuth and elevation directions, respectively. Thus, the GS antenna and monopulse system measure the AC at azimuth and elevation locations $(\theta, \phi)$, where $(\theta, \phi) = (\Theta + \delta\theta, \Phi + \delta\phi)$. Summarizing, the INS system aboard the AC measures $(p_x, p_y, p_z)$, $(v_x, v_y, v_z)$ and $(a_x, a_y, a_z)$, and the GS monopulse system measures the deviation errors $(\delta\theta, \delta\phi)$ and the motor encoding settings $(\Theta, \Phi)$. In FIG. 7, to which reference is now made, location 130 $(x', y', z')$ in the system of coordinates (X,Y,Z) is shown. The relationship between a location $(x', y', z')$ in the system of coordinates (X,Y,Z) and the azimuth and elevation angles $(\theta', \phi')$ are given by equations 1 and 2 respectively:

$$\tan\theta' = \frac{y'}{x'} \quad (1)$$

$$\tan\varphi' = \frac{z'}{\sqrt{(x')^2 + (y')^2}} \quad (2)$$

EXAMPLE 1

State Equations

1) State Vector Definition

The state variables are aggregated in a state vector, given by:

$x = (p_x\ v_x\ a_x\ p_y\ v_y\ a_y\ p_z\ v_z\ a_z\ \delta\theta\ \delta\phi)^T$

Thus, the state variables include:
  a. The AC state (position, velocity, and acceleration).
  b. The monopulse deviation errors.

The following sections describe the state equations for each state variable.

2) State Equations for AC Motion

The state equation describing the AC motion in the x direction is modeled by equation 3:

$$s_x(n+1) = Hs_x(n) + bu_x(n) \quad (3)$$

where, $$s_x(n) = \begin{pmatrix} p_x \\ v_x \\ a_x \end{pmatrix}$$

is the state vector in the x direction at sample time n, $$H = \begin{pmatrix} 1 & T & T^2/2 \\ 0 & 1 & T \\ 0 & 0 & 1 \end{pmatrix}, b = \begin{pmatrix} 0 \\ 0 \\ 1 \end{pmatrix},$$

and $u_x$ is the process driving noise in the x direction.

Analogous expressions are assumed for the state equations in the y and z directions.

3) State Equations for Monopulse Deviation Error

The monopulse deviation error is modelled by a first order autoregressive process given by equations 4 and 5:

$$\delta\theta(n+1) = \rho_\theta \delta\theta(n) + u_\theta(n) \quad (4)$$

$$\delta\phi(n+1) = \rho_\phi \delta\phi(n) + u_\phi(n) \quad (5)$$

where $0 < \rho_\theta, \rho_\phi < 1$ and $u_\theta, u_\phi$ are the process driving noises.

EXAMPLE 1

Aggregated State Equation

The state equations described above, for the AC motion and for the monopulse deviation errors, can be aggregated in a single linear state equation, given by equation 6:

$$x(n+1) = Ax(n) + Bu(n) \quad (6)$$

where $x = (p_x\ v_x\ a_x\ p_y\ v_y\ a_y\ p_z\ v_z\ a_z\ \delta\theta\ \delta\phi)^T$ is the state vector, $u = (u_x\ u_y\ u_z\ u_\theta\ u_\phi)^T$ is the process driving noise vector with given covariance matrix $C_u$. The matrix A is given by (in block notation):

$$A = \begin{pmatrix} H & 0_{3\times 3} & 0_{3\times 3} & 0_{3\times 2} \\ 0_{3\times 3} & H & 0_{3\times 3} & 0_{3\times 2} \\ 0_{3\times 3} & 0_{3\times 3} & H & 0_{3\times 2} \\ 0_{2\times 3} & 0_{2\times 3} & 0_{2\times 3} & \rho \end{pmatrix}$$

with $\rho = \begin{pmatrix} \rho_\theta & 0 \\ 0 & \rho_\varphi \end{pmatrix}$, and $0_{3\times 3}, 0_{3\times 2}, 0_{2\times 3}$ are zero matrices with the corresponding dimensions. The matrix B is given by:

$$B = \begin{pmatrix} 0 & 0 & 0 & 0 & 0 \\ 0 & 0 & 0 & 0 & 0 \\ 1 & 0 & 0 & 0 & 0 \\ 0 & 0 & 0 & 0 & 0 \\ 0 & 0 & 0 & 0 & 0 \\ 0 & 1 & 0 & 0 & 0 \\ 0 & 0 & 0 & 0 & 0 \\ 0 & 0 & 0 & 0 & 0 \\ 0 & 0 & 1 & 0 & 0 \\ 0 & 0 & 0 & 1 & 0 \\ 0 & 0 & 0 & 0 & 1 \end{pmatrix}$$

EXAMPLE 1

Measurement Equations

The measured variables are aggregated in a measurement vector, given by:

$y = (\bar{p}_x\ \bar{v}_x\ \bar{p}_y\ \bar{v}_y\ \bar{p}_z\ \bar{v}_z\ \overline{\delta\theta}\ \overline{\delta\phi}\ \overline{\Theta}\ \overline{\Phi})^T$ Thus, the measurement variables contain:
  a. The INS measurements (of AC position and velocity).
  b. The monopulse deviation errors.
  c. The motor encoder measurements.

Note that measurement variables are denoted by an over-bar, to distinguish them from the state variables. Next, the following sections describe the measurement equations for each measurement variable.

EXAMPLE 1

INS Measurement Equations

In this example, the INS measures the AC position and linear velocity, aggregated in the following vector:

$y_{INS} = (\bar{p}_x\ \bar{v}_x\ \bar{p}_y\ \bar{v}_y\ \bar{p}_z\ \bar{v}_z)^T$ The INS measurement equations are given by equation 7:

$$y_{INS}(n) = Cx(n) + w_{INS}(n) \quad (7)$$

where:

$$C = \begin{pmatrix} 1 & 0 & 0 & 0 & 0 & 0 & 0 & 0 & 0 & 0 & 0 \\ 0 & 1 & 0 & 0 & 0 & 0 & 0 & 0 & 0 & 0 & 0 \\ 0 & 0 & 0 & 1 & 0 & 0 & 0 & 0 & 0 & 0 & 0 \\ 0 & 0 & 0 & 0 & 1 & 0 & 0 & 0 & 0 & 0 & 0 \\ 0 & 0 & 0 & 0 & 0 & 0 & 1 & 0 & 0 & 0 & 0 \\ 0 & 0 & 0 & 0 & 0 & 0 & 0 & 1 & 0 & 0 & 0 \end{pmatrix}$$

and $$W_{INS} = \begin{pmatrix} w_{px} \\ w_{vx} \\ w_{py} \\ w_{vy} \\ w_{px} \\ w_{vx} \end{pmatrix}$$

is the INS measurement noise vector, with given covariance matrix $C_{INS}$.

EXAMPLE 1

Monopulse Measurement Equations

The monopulse system measures the values of the antenna motor encoders $(\Theta, \Phi)$ in the azimuth and elevation directions, respectively. In addition, the monopulse deviation errors $(\overline{\delta\theta}, \overline{\delta\phi})$ in the azimuth and elevation directions, respectively, are measured.

Thus, the measurement equations 8 and 9 for the deviation errors are:

$$\overline{\delta\theta}(n) = \delta\theta(n) + w_\theta(n) \quad (8)$$

$$\overline{\delta\phi}(n) = \delta\phi(n) + w_\phi(n) \quad (9)$$

where $w_\theta, w_\phi$ are the measurement noises of both values, with given covariances.

The measurement equations for the motor encoder values are given by equations 10 and 11 respectively:

$$\overline{\Theta}(n) = \tan^{-1}\frac{p_y(n)}{p_x(n)} - \delta\theta(n) + w_\Theta(n) \quad (10)$$

$$\overline{\Phi}(n) = \tan^{-1}\frac{p_z(n)}{\sqrt{p_x(n)^2 + p_y(n)^2}} - \delta\varphi(n) + w_\Phi(n) \quad (11)$$

where $w_\Theta, w_\Phi$ are the measurement noises of both values, with given covariances.

It is noted, that all the measurement equations are linear, with the exception of equations 10 and 11. In addition, equations 10 and 11 fuse monopulse state and INS state. This data fusion is used by the Kalman filter in order to improve the estimations of both the AC state and the monopulse errors, which are also measured separately.

EXAMPLE 1

Kalman Filter for State Estimation

The standard Kalman filter cannot be used directly with the equations given above, because the equations are nonlinear, in particular motor encoder measurement equations.

A possible solution is to use an adaptive filter such as the nonlinear Kalman filter, extended Kalman filter, particle filter or scented filter. One such technique is disclosed in M. Nørgaard, N. K. Poulsen, and O. Ravn, "Advances in Derivative Free State Estimation for Nonlinear Systems", Technical report IMM-REP-1998-15, Technical University of Denmark, 2000, the contents of which are incorporated herein by reference.

EXAMPLE 2

Figure 8:
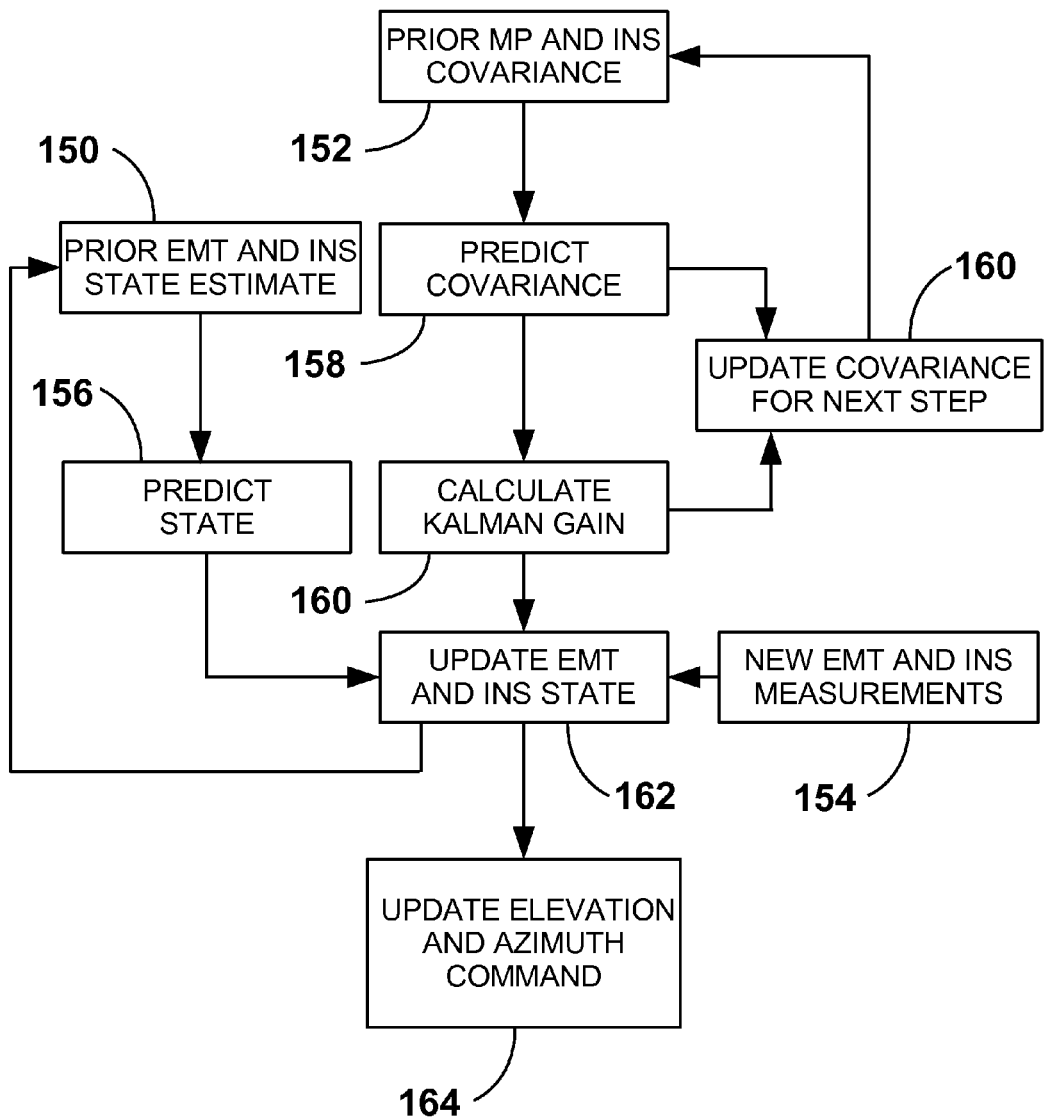
FIG. 8 is a schematic description of Kalman filter implemented in the context of the present invention.

Explanation of FIG. 8, Kalman Filter Block Diagram in the Context of the Present Invention An example of a Kalman filter implementation in the context of the present invention is described schematically in FIG. 8 which reference is now made. A Kalman filter initially receives as an input prior estimation of EMT and INS state data 150 prior EMT and INS covariance 152 and New EMT and INS measurements 154. The state 156 and covariance 158 predictions are than updated using a dynamic mathematical model. Kalman gain is then calculated 160 and the NMPS is updated 162 using the gain and the difference between predicted state 156 and newly measured state 154. New azimuth and elevation parameters 164 as calculated from the updated state are utilized in order to send to the antenna a tracking command. The covariance is updated 160 as a preparation to the next Kalman procedure.

Number and Deployment of Tracking Units

In accordance with the present invention, the MP state data can be collected from two or more independent units, one of which is on board the MP. Other tracking units are typically positioned statically on the ground but in other scenarios, the additional tracking systems may be deployed on a moving object.

It will be appreciated that the present invention is not limited by what has been described hereinabove and that numerous modifications, all of which fall within the scope of the present invention, exist. It will be appreciated by persons skilled in the art that the present invention is not limited by what has been particularly shown and described herein above. Rather the scope of the invention is defined by the claims which follow:

The invention claimed is:

1. A method of tracking a moving platform having an on-board navigation system, the method comprising:
   using a communication channel to send state data provided by the navigation system of the moving platform to a tracking system state estimator of a processing facility of a ground station having at least one antenna;
   collecting additional state data derived from at least one electromagnetic tracking system by the processing facility;
   calculating, using a processor tracking data by implementing a merging process, by the tracking system state estimator, of the state data provided by the navigation system of the moving platform and the state data derived from the at least one electromagnetic tracking system; and
   effecting encoders of motors in a turning device of the antenna to direct at least one antenna for tracking the moving platform.

2. The method as in claim 1 wherein the processing facility performs a location calculation whereby data acquired at one point in time by the navigation system and by the electromagnetic tracking system are used to estimate the position of the moving platform at a next point in time.

3. The method as in claim 1 wherein the navigation system of the moving platform is an inertial navigation system.

4. The method as in claim 1 wherein the navigation system of the moving platform is a star tracker.

5. The method as in claim 1 wherein calculating tracking data involves merging of data using an adaptive filter.

6. The method as in claim 1 wherein at least one tracking unit is deployed on the moving platform.

7. The method as in claim 1 wherein state data are processed by a tracking system state estimator and sent to the navigation system on board the moving platform to update on-board coordinates of the moving platform.

* * * * *